United States Patent [19]
Hildingsson et al.

[11] Patent Number: 5,990,568
[45] Date of Patent: Nov. 23, 1999

[54] YAWING SYSTEM FOR ADJUSTING A WIND TURBINE INTO A REQUIRED WIND DIRECTION BY TURNING THE TURBINE ABOUT A YAWING AXLE

[75] Inventors: Sten Hildingsson, Kristinehamn; Torbjörn Westin, Partille, both of Sweden

[73] Assignee: Kvaerner ASA, Lksaker, Norway

[21] Appl. No.: 09/091,178

[22] PCT Filed: Dec. 6, 1996

[86] PCT No.: PCT/SE96/01604

§ 371 Date: Jun. 10, 1998

§ 102(e) Date: Jun. 10, 1998

[87] PCT Pub. No.: WO97/22804

PCT Pub. Date: Jun. 26, 1997

[30] Foreign Application Priority Data

Dec. 18, 1995 [SE] Sweden ................................... 9504512

[51] Int. Cl.⁶ .................................. F03D 9/00; H02P 9/04
[52] U.S. Cl. ................................ 290/55; 290/52; 290/44; 290/53; 290/54
[58] Field of Search ..................... 290/52–55; 416/9–11, 416/44, 47, 140

[56] References Cited

U.S. PATENT DOCUMENTS

| | | | |
|---|---|---|---|
| 4,515,525 | 5/1985 | Doman | 416/11 |
| 4,522,564 | 6/1985 | Carter, Jr. et al. | 416/140 |
| 4,792,281 | 12/1988 | Coleman | 416/156 |
| 5,178,518 | 1/1993 | Carter, Sr. | 416/11 |
| 5,353,593 | 10/1994 | Phillips | 60/393 |
| 5,354,175 | 10/1994 | Coleman et al. | 416/9 |
| 5,584,655 | 12/1996 | Deering | 416/31 |

FOREIGN PATENT DOCUMENTS 0 110 807   6/1984   European Pat. Off. .................. 416/11

*Primary Examiner*—Elvin Enad
*Attorney, Agent, or Firm*—Griffin, Butler, Whisenhunt & Szipl, LLP

[57] ABSTRACT

A yawing system for a wind turbine is provided. The system adjusts the wind turbine into a required wind direction against the wind by turning the turbine about a yawing axle (14) and counteracts periodic vibrations in a nacelle of the turbine as it turns around the yawing axle from being transmitted as pulsating moments to a tower structure. At least one hydraulic motor (34) turns the nacelle (12) about the yawing axle (14). A controllable throttle valve (50) is disposed in a parallel line to the hydraulic motor (34). A regulator (30) is capable of changing an opening diameter of said throttle valve (50) in accordance with a position of the nacelle in relation to the wind direction such that the periodic vibrations are utilized for turning the nacelle and correcting for changes in the wind direction during operation by a successive movement of the nacelle in small steps in the required wind direction during each periodic vibration around the yawing axle and at the same time as the nacelle is dampened.

7 Claims, 5 Drawing Sheets

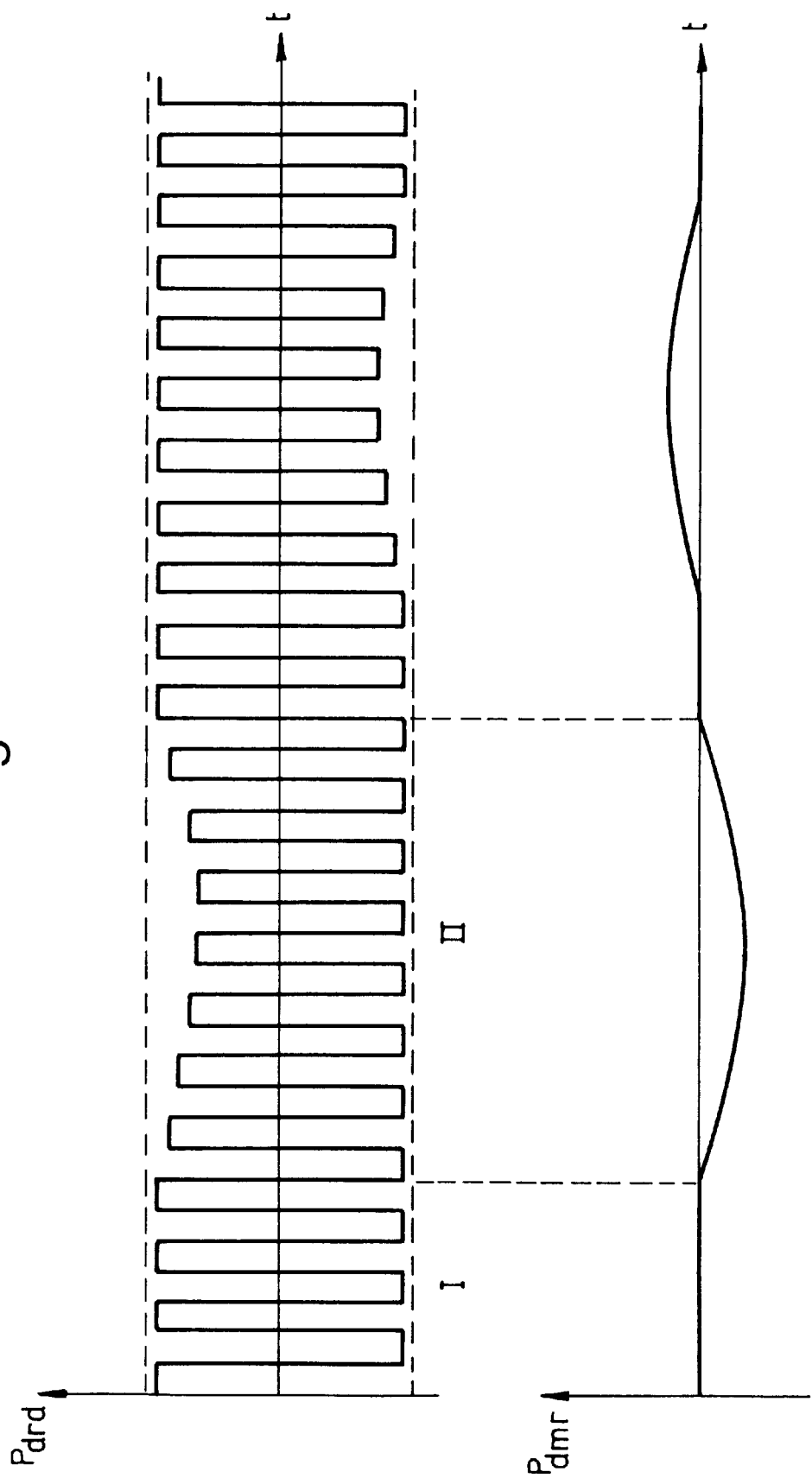

YAWING SYSTEM FOR ADJUSTING A WIND TURBINE INTO A REQUIRED WIND DIRECTION BY TURNING THE TURBINE ABOUT A YAWING AXLE

TECHNICAL AREA

The present invention relates to a yawing system for wind turbines intended for adjusting the wind turbine in the required wind direction about the yawing axis of the turbine and for preventing periodic vibrations in the nacelle around the yawing axis being transmitted as pulsating moments to the tower structure.

BACKGROUND TO THE INVENTION

Hydraulic motors are conventionally used in wind power stations to yaw the turbine nacelle to the required angle against the wind. Once the required position is reached the nacelle is locked with powerful brakes. The turbine is kept in this position until the wind direction has changed by a certain minimum angle, whereupon the brakes are released and the turbine is rotated to a new position where it is again locked etc. The system has a number of disadvantages and limitations; the turbines do not provide optimum efficiency and the stresses on the brakes are very large which often results in slipping and damage. Another problem of wind turbines is that the vibrations occurring in the nacelle as a result of the forces acting on the rotor are not equally large over the entire sweep area of the rotor. For example, the wind speed is often higher at greater heights than nearer the ground.

These problems are well known and many systems have been developed to prevent these fluctuations being transmitted as pulsating moments to the power station structure, more particularly the tower. For example, EP-A1-0 110 807 describes a system in which a controllable flow valve is arranged in a by-pass line to the hydraulic motor which is intended to yaw the nacelle towards the wind, while accumulators are provided to reduce the pressure vibrations in the hydraulic system caused by the nacelle fluctuations about the yawing axis. The inventors of the now proposed system have tested systems of this type and have found that in order to achieve an intended effect by the by-pass valve, its throttle must be of such a large diameter that it would need a very large flow from the oil pump to get the turbine to yaw at all. This solution is therefore considered to be impossible to use in practice.

There also remains the problem that the energy which is produced by the nacelle fluctuations is not in itself transmitted to the tower but is retained in the hydraulic system through recharging the accumulators. In addition the energy stored in the accumulators acts in the wrong direction, so to speak, as when the nacelle has swung round to an end position and the accumulators have been fully recharged, the pressure is exerted in the same direction as the returning vibrations and so does not damp the vibration but increases it instead. The unwanted energy from the fluctuations is therefore not removed to any great extent.

DESCRIPTION OF THE INVENTION

The aim of the invention is to reduce the periodic vibrations which arise during operation, to prevent the energy produced as a result of the vibrations being transmitted to the turbine structure, as well as to yaw the turbine continuously during operation against the direction of the wind. This aim is achieved with a wind turbine yawing system for adjusting the wind turbine in the required direction against the wind by rotation about the yawing axle of the turbine and preventing periodic vibrations in the nacelle around the yawing axle being transmitted as pulsating moments to the tower structure, which is characterised in that the nacelle is arranged so as to be able to rotate about the yawing axle with the aid of at least one hydraulic motor, that a controllable throttle valve is arranged in a parallel line (by-pass line) of the hydraulic motor, and that the opening diameter of said parallel valve is arranged so as to be adjustable in accordance with the nacelle position in relation to the wind direction.

DESCRIPTION OF THE FIGURES

In the following description of a preferred embodiment, reference is made to the following figures in which FIG. 6 shows signals for a nominal value as input signals for controlling the parallel valve.

DESCRIPTION OF A PREFERRED EMBODIMENT

Figure 1:
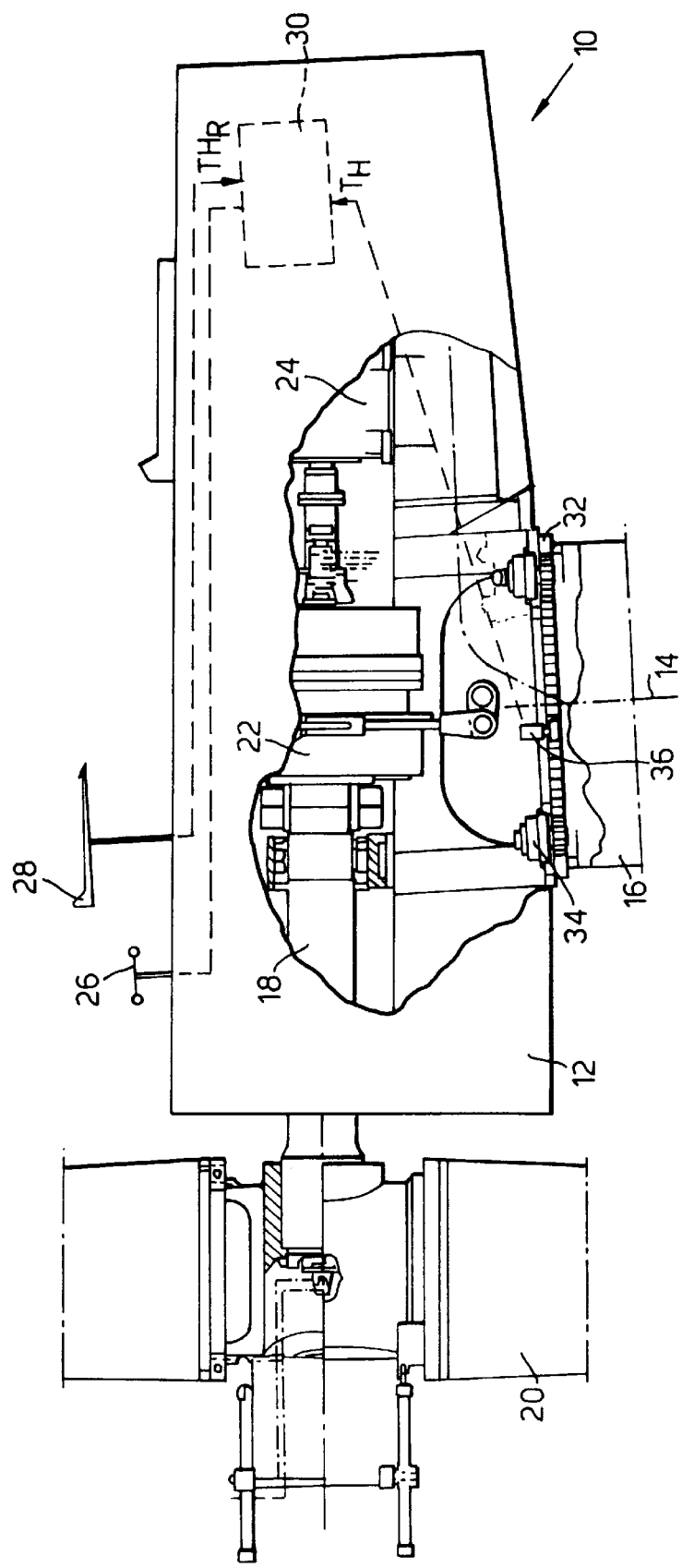
FIG. 1 is a side view of the nacelle of a wind turbine in a partially cut away view.

The wind turbine in which the present invention is intended to be installed is shown at reference number 10 in FIG. 1. In a conventional manner the turbine comprises a nacelle 12 which is rotatably mounted on a tower 16 around a yawing axle 14. The nacelle 12 comprises a turbine axle 18, at one end of which there is arranged a rotor 20. The other end of the axle 18 is connected to a gear 22 which via gear changes transmits the rotation to a generator 24. A windspeed measurer 26 for measuring the strength of the wind, and a wind direction sensor, or wind flag 28 are arranged on the nacelle. These are connected via lines to a controlling and regulating unit 30 which includes a microcomputer.

Figure 2:
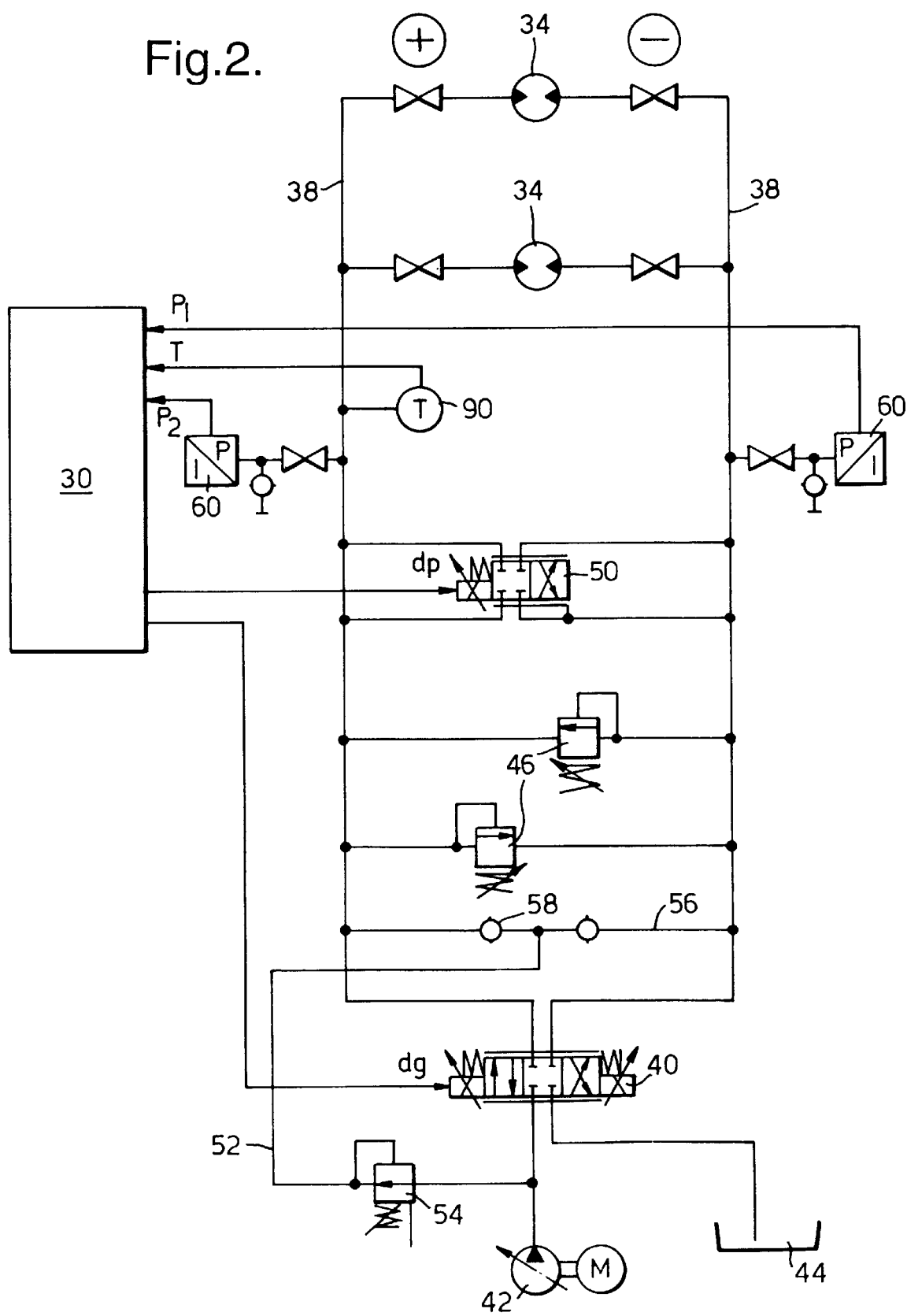
FIG. 2 is a circuit diagram of the yawing hydraulics system.

The nacelle 12 is rotatably connected to the tower 16 via bearings 32. Between the tower and the nacelle, two hydraulic motors 34 are arranged in the shown embodiment. A direction sensor 36 is also arranged between the tower and the nacelle. The direction sensor is connected to the control unit 30 via lines. Referring to FIG. 2, the hydraulic motors 34 are connected in parallel to two hydraulic lines 38. The lines 38 are connected to a proportional control valve 40, i.e. a control valve with an opening diameter which is proportional to the applied voltage, and which in turn is connected partly to a hydraulic pump 42 and partly to a hydraulic oil tank 44. Between the lines 38, two pressure-reduction valves 46 are arranged, i.e. in parallel with the hydraulic motors 34 and directed in opposite directions. In parallel with the hydraulic motors 34 a proportionally controlled regulating valve 50 is also connected, which is hereinafter referred to as the parallel valve. A refilling line 52 is connected via an overload valve 54 from the hydraulic pump 42 to a parallel line 56. This line is equipped with a check valve 58 on each side of the connection of the refilling line 52.

Each of the lines 38 to the hydraulic motors 34 is provided with a pressure sensor 60 for measuring the hydraulic pressure on each side of the hydraulic motors 34. The pressure sensors 60 are connected via lines to the regulating unit 30. A temperature sensor 90 is connected to the hydraulic circuit and is connected via lines to the control unit 30. In addition, the regulating valve 40 and parallel valve 50 are also connected to the control unit 30.

The invention will be described below in more detail in terms of three different conditions in order to explain the construction, operation and control criteria of the control system.

Rotation of the Nacelle at Low Windspeeds

When the turbine is active the hydraulic systems is under pressure, the control system is active and all the sensors are continuously monitored. At certain windspeeds the turbine does not rotate as the installation does not produce any electricity of value at low windspeeds. However, the turbine and nacelle should be kept in the direction of the wind in order to be ready to operate if the wind should increase in strength. The wind flag 28 on the nacelle indicates the wind direction and its signal is sent continuously to the control unit 30. If the nacelle is not at the correct angle to the wind direction, the control unit (regulating unit) 30 opens the regulating valve 40 and pressurised hydraulic oil flows into the lines 38 to the hydraulic motors 34 which then turn the nacelle. The direction sensor 36 checks the direction of the nacelle and when this corresponds to the direction indicated by the wind flag 28 the regulating valve 40 is throttled and the nacelle stops. The operation of the parallel valve 50 will be described in more detail below, but is closed during this yawing.

Increased Windspeed From a Fixed Direction

Figure 3:
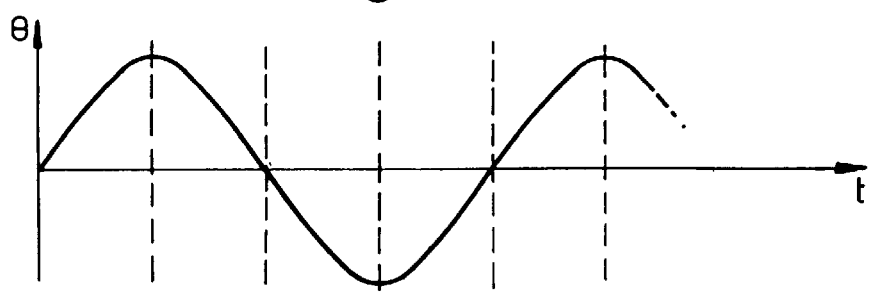
FIG. 3 shows variations of the nacelle angle in relation to the wind direction in periodic vibrations about the yawing axis of the nacelle.
Figure 4:
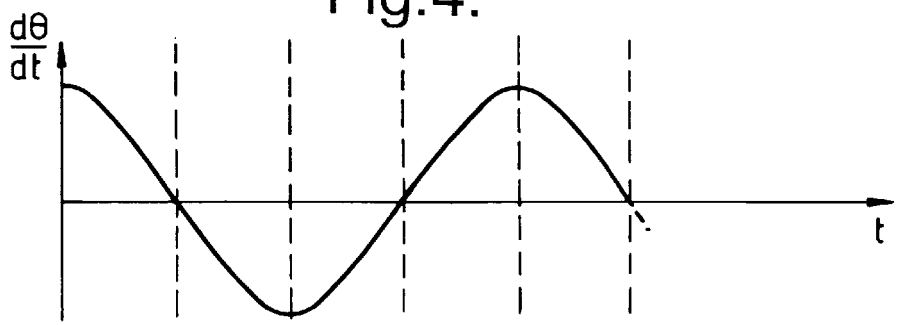
FIG. 4 shows variations of the nacelle vibration speed in accordance with FIG. 3.
Figure 5:
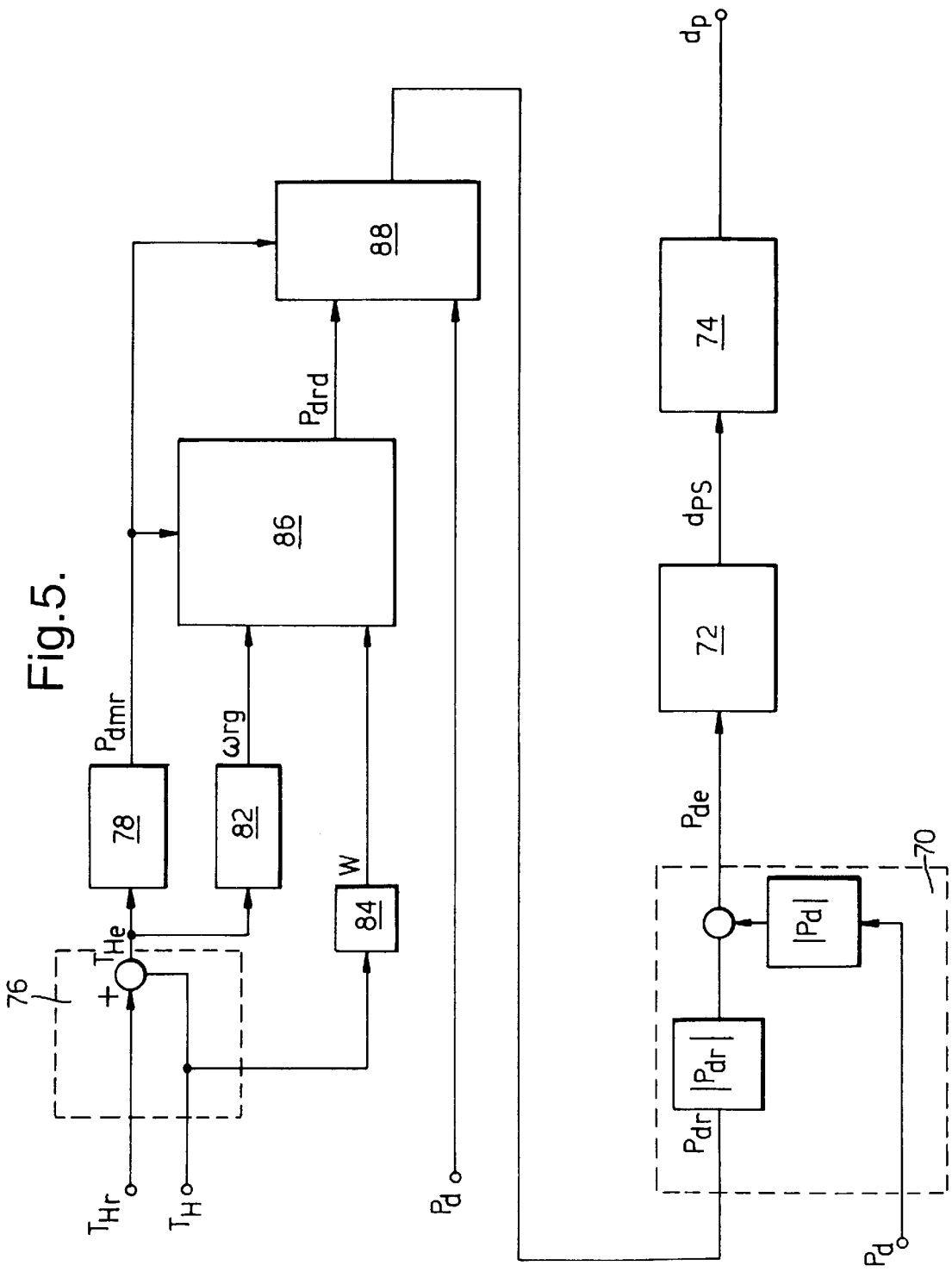
FIG. 5 is a control diagram for obtaining and processing of control signals in a parallel valve included in the system.

When the windspeed has increased to a certain predetermined value, the wind turbine begins to rotate. This can occur by the turbine blades being rotated from a vane position to an operating position and/or the brakes which lock the turbine axle 18 in the parking position being released. When the turbine rotates, varying forces are produced on this and on the entire installation. These variations are predominantly due to the fact that the windspeed is different at different heights, usually being greater at greater heights, so that the turbine blade of rotor 20 which is higher is under greater load than the other blade during rotation. The variations produce periodic vibrations of the nacelle 12 about its yawing axle 14. FIG. 3 shows the yawing angle as a function of time and FIG. 4 shows the yawing angle speed. Yawing about the yawing axle results in the hydraulic motors starting to rotate, and depending on the direction a pressure is built up in one or the other line and hydraulic oil flows. The flow from the hydraulic motors and the pressure vary with the same phase as the yawing speed, i.e. when the speed is greatest the pressure difference is greatest. The control unit 30 continuously receives information about pressure levels $P_1$ and $P_2$ in both lines and calculates the differential pressure as the difference in pressure in both lines. The differential pressure enters the control circuit 70, FIG. 5, as an actual value, hereinafter called $P_d$. A nominal differential pressure value is entered into the control circuit. hereinafter called $P_{dr}$. How the value of $P_{dr}$ is obtained will be described below.

Before the $P_{dr}$ value and the $P_d$ value are introduced into the control circuit, the absolute value is taken. In the control circuit these are compared and the control error leaves the circuit as a value $P_{de}$. The $P_{de}$ value is first processed in a so-called lag filter 72 which is a type of low-pass filter where lower frequencies are amplified more than are higher frequencies. From the lag filter 72 a signal $d_{ps}$ is obtained which shall be sent to the parallel valve 50 and which corresponds to the throttling, i.e. the greater the control error the greater the opening. As the parallel valve 50 generally operates in reverse, i.e. the greater the control error the smaller the opening of valve 50, the value from the lag filter 72 has to be inverted. This is done in a circuit 74 which inverts the signal $d_{ps}$ with a correction factor. From circuit 74 a signal $d_p$ is obtained, the magnitude of which corresponds to the diameter of the parallel valve, i.e. a voltage of a certain value is applied to the valve control which opens to the corresponding extent. When the parallel valve 50 opens, oil flows from the line at higher pressure via the valve 50 to the line at lower pressure. As stated, the pressures are measured continuously and the differential pressure $P_d$ is thus continuously compared with the nominal value $P_{dr}$ and the regulating error $P_{de}$ continuously controls, after processing, the diameter $d_p$ of the parallel valve.

Determination of the Nominal Differential Pressure Value

As described above, the parallel valve is thus controlled by comparing the differential pressure with a nominal value and the valve is opened and closed until the control error is minimised. The nominal differential pressure value is obtained as follows. The wind flag 28 continuously indicates the wind direction, i.e. the nominal value of the yawing angle which the nacelle should have, hereinafter called THr. At the same time the direction sensor 36 indicates the actual value of the nacelle yawing angle, called TH. Both of these signals enters into a control circuit 76 and the control error THe is obtained as the output signal. As the nacelle experiences periodic vibration about the nominal value THr, the control error THe will continuously change its sign. The control error is partly entered into a circuit which includes a lag filter 78 for calculating the required mean differential pressure $P_{dmr}$. The control error THr further enters as a signal into another lag filter 82 for calculating the mean nominal speed $\omega_{rg}$. i.e. the yawing speed which the machine should have. The signal from the direction sensor 36 is also taken and derived in a circuit 84 in order to obtain the actual value $\omega$ of the rotation speed. Due to the periodic vibrations this signal also changes its sign.

The signals $P_{dmr}$, $\omega_{rg}$ and $\omega$ are input values in a circuit 86 for calculation of the actual value of the damping pressure $P_{drd}$. The signal $P_{dmr}$ which leaves the circuit 78 is processed in such a way that the filter amplifies low frequencies and removes higher frequencies. This means that in the event of the wind being from a constant direction and the nacelle periodically turning about the yawing axle, the frequency of the control error THe obtained by comparing THr and TH will be filtered out and $P_{dmr}$ is equal to zero. If $P_{dmr}$ is zero the damping pressure $P_{drd}$ is set just below the maximum the hydraulic system can withstand. The signal from the rotation speed T is used in such a way that the sign is used to indicate whether the damping pressure should be positive or negative.

As the nacelle vibrates periodically, the sign changes periodically. A damping pressure $P_{drd}$ Output signal is thus obtained as a square wave of constant amplitude which is symmetrical about zero. The signal is then processed in a circuit 88 known as the energy zero setter, which will be described in more detail below. The output signal from this circuit 88 is now the nominal value $P_{dr}$ of the differential pressure and is then entered in the form of a symmetrical square wave, part I of the curve in FIG. 6, into the control circuit 70 where it is first absolute value processed. As the signal before this is a symmetrical square wave, the signal has a constant positive nominal value after absolute value conversion.

As stated above, the actual value $P_d$ of the differential pressure enters the control circuit 70 and is compared with the constant nominal value. The control error signal $P_{de}$ therefore fluctuates with the vibrations and $P_{de}$ will be smaller the higher the differential pressure is. As $P_{de}$ is inverted, the signal therefore opens the parallel valve $d_p$, said signal being essentially proportional to the opening diameter of the parallel valve, being greater the higher the differential pressure. This means that at the nacelle's end positions for the vibrations, the differential pressure is at its lowest, and the parallel valve opening diameter as large as possible. When the nacelle then turns back from the end position, the differential pressure increases as the hydraulic motors start to rotate. This is detected by the pressure sensors 60 and the calculated differential pressure enters the control circuit and is compared with the nominal value.

Figure 7:
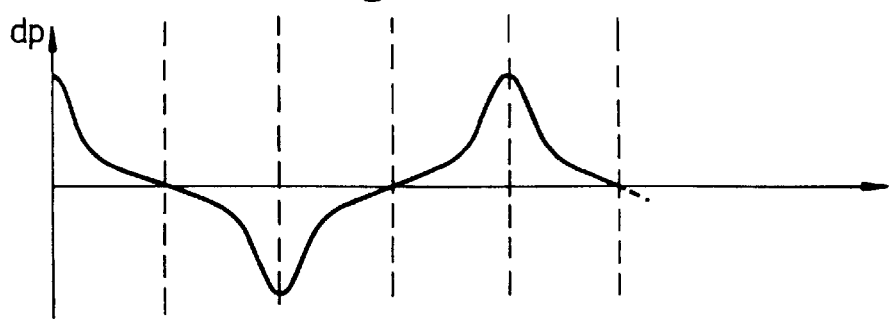
FIGS. 7 & 8 shows changes in the pressure difference in the hydraulic system during periodic vibration for a valve with a fixed throttle and a valve controlled in accordance with the invention.
Figure 8:
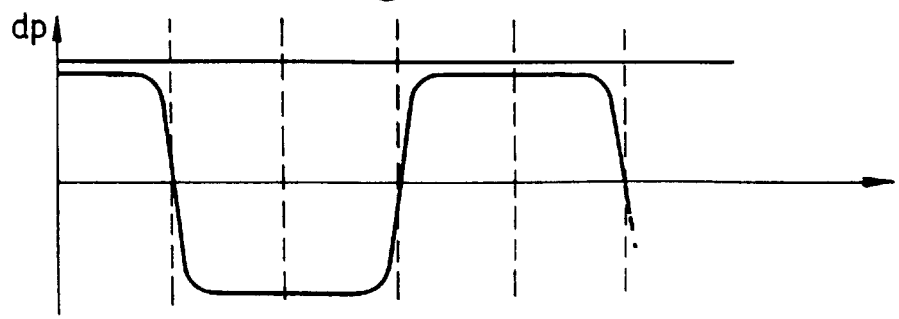

The output signal from the control circuit will thus become smaller and the opening diameter of the valve will thus become smaller. The control circuit thus controls the valve so that it operates in such a way as to keep the differential pressure at a relatively constant level. The differential pressure acts as a damping force to damp the vibrations at the same time as the energy produced by the vibrations is transmitted to the hydraulic system and given off as heat when the hydraulic oil passes through the parallel valve. The damping force is obtained as the area between the curves for the differential pressure and the x-axis. As can be seen in FIGS. 7 and 8, if a parallel valve with a fixed throttle is compared with a parallel valve controlled in accordance with the invention, a much greater damping force is obtained with a throttle in accordance with the invention.

Relatively Strong Wind Which Changes Direction

If the wind changes direction during operation, the nacelle has to be turned into the wind in order partly to achieve optimum operation and partly to avoid oblique stresses on the installation. When the wind changes direction this is registered by the wind flag and THr is changed. This change is introduced into control error $TH_e$ as a low frequency signal change which is amplified in the lag filter. A value of $P_{dmr}$ is thus obtained, see the lower curve in FIG. 6, which is used for calculating the damping pressure $P_{drd}$. For the nacelle to turn in the required direction, $P_{drd}$ is reduced by the appropriate value and with the appropriate sign. $P_{drd}$ thus obtains a signal which looks like a non-symmetrical square wave, i.e. with a lower vibration amplitude on one side of the x-axis, see part II of the curve in FIG. 6. $P_{drd}$ is entered as a nominal value into control circuit 70 for the parallel valve and is processed in the same way as described above. What now occurs in the regulation of the parallel valve is that the valve fully damps one direction and somewhat less the other direction, i.e. the direction towards which the nacelle has to be turned. The regulation achieves a successive movement of the nacelle in small steps in the required direction during each periodic vibration around the yawing axle at the same time as it is damped by the system. The periodic vibrations are thus utilised for turning the nacelle and correcting for changes in the wind direction during operation. The control valve 40 does not therefore have to be used to change the direction of the nacelle during operation.

As stated above, the signal $P_{drd}$ is entered into and is processed in a so-called energy zero setter 88. Signals $P_{dmr}$, $P_d$ and $P_{drd}$ are entered into this circuit. The hydraulic system in accordance with the invention operates at a system pressure of 350 bar as a high pressure is an advantage for attaining a high moment on the hydraulic motors 34. A disadvantage of this high system pressure is that there is a resilient effect in the hydraulic oil as the oil is slightly compressible. The resilience effect is shown in a differential pressure which is remains at the end position of the periodic vibrations, as the differential pressure should be zero and should thus counteract damping. The energy zero setter 88 gives the parallel valve a nominal value when the speed is zero so that it opens fully, allows oil to pass through and thus reduces the differential pressure at this point. If the wind direction is fixed, the differential pressure is preferably lowered to zero, but if correction of the nacelle is necessary due to changes in the wind direction, the pressure is lowered to a certain value. The regulation in the energy zero setter does this if the signal from $P_{dmr}$ has a value other than zero.

Throttling of the hydraulic oil through the parallel valve 50 produces a large amount of heat in the hydraulic oil as the energy from the periodic vibrations in the valve is converted to heat. In order to keep the temperature at a normal operating temperature it must be replaced and cooled continuously. This is done by the control valve 40 continuously supplying new oil and removing heated oil. The regulation of the control valve 40 as described above can always take place, even when the turbine is operating. The flow from the latter is compensated directly by the parallel valve 50 and the flows from the yawing valve are generally set much lower than the flows arising during the damping of the period vibrations. The temperature in the hydraulic circuit is also monitored continuously by means of temperature sensor 90, FIG. 2.

With a system of damping and yawing in accordance with the invention several advantages are obtained. On the one hand the existing hydraulic system and hydraulic motors are used, and on the other hand, through the active throttling of the parallel valve, a much better damping is achieved than with existing systems at the same time as the unwanted energy from the vibrations is removed from the system instead of being transmitted to the structure or kept within the system, and, in addition, throttling of the parallel valve allows the nacelle to be yawed at the same time as it is damped.

It should be understood that the invention is not restricted to the above description and to the embodiments shown in the figures, but can be modified within the framework of the following claims.

We claim:

1. A yawing system for a wind turbine for adjusting the wind turbine into a required wind direction against the wind by turning the turbine about a yawing axle (14) and for counteracting periodic vibrations in a nacelle of the turbine as it turns around the yawing axle from being transmitted as pulsating moments to a tower structure, comprising at least one hydraulic motor (34) for turning the nacelle (12) about the yawing axle (14), a controllable throttle valve (50) disposed in a parallel line to the hydraulic motor (34), and a regulator (30) capable of changing an opening diameter of said throttle valve (50) in accordance with a position of the nacelle in relation to the wind direction such that the periodic vibrations are utilized for turning the nacelle and correcting for changes in the wind direction during operation by a successive movement of the nacelle in small steps in the required wind direction during each periodic vibration around the yawing axle and at the same time as the nacelle is dampened.

2. A system according to claim 1, wherein there are at least two hydraulic motors and the periodic vibrations in the nacelle produce pressure differences in hydraulic lines (38) which are connected to the hydraulic motors, a direction sensor (36) and a wind direction indicator (28) are arranged for continuously measuring an actual value (TH) and a nominal value ($TH_r$) of the position of the nacelle, a control circuit (76) is arranged for continuously comparing a difference between the actual value and the nominal value ($TH_e$), where the difference involves a nominal value ($P_{dr}$) of a desired pressure difference, a pressure sensor (60) is arranged for continuously measuring the actual value ($P_d$) of said pressure difference, and further control circuit (70) is provided for comparing the actual and nominal values of said pressure difference, where the difference between the actual and nominal values ($P_{de}$) constitutes a control signal for said throttle valve (50).

3. A system according to claim 2, wherein the throttle valve (50) is arranged to be controlled in such a way that said pressure difference between the actual and nominal values of said pressure difference is minimized.

4. A system according to claim 3, wherein the direction sensor (36) continuously measures the speed (ω) of the nacelle during the periodic vibrations, and the regulator (30) adjusts the nominal value ($P_{dr}$) of said pressure difference to the same positive or negative sign as the sign of said speed so that said nominal value is periodically varied between a positive and a negative value.

5. A system according to claim 4, wherein the regulator (30) is capable of setting the nominal value ($P_{dr}$) of said pressure difference to a value just below a maximum loading value of a hydraulic system for yawing the nacelle, if the difference between the actual and nominal values of a nacelle position varies symmetrically.

6. A system according to claim 4, wherein regulator (30) is capable of changing the nominal value ($P_{dr}$) of said pressure difference with an amplitude difference, if the difference between the actual and nominal values of the nacelle does not vary symmetrically.

7. A system according to claim 6, wherein regulator (30) is capable of reducing a positive value of the pressure difference nominal value by a corresponding amount if the sign of the amplitude difference is positive, and vice-versa.

* * * * *